United States Patent
Kuo et al.

(10) Patent No.: US 8,953,712 B2
(45) Date of Patent: Feb. 10, 2015

(54) METHOD FOR DATA MODULATION AND TRANSMITTER USING THE SAME

(71) Applicant: Industrial Technology Research Institute, Hsinchu (TW)

(72) Inventors: Ping-Heng Kuo, Pingtung County (TW); Sung-En Chiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 46 days.

(21) Appl. No.: 13/887,380

(22) Filed: May 6, 2013

(65) Prior Publication Data

US 2014/0056383 A1 Feb. 27, 2014

Related U.S. Application Data

(60) Provisional application No. 61/693,340, filed on Aug. 27, 2012.

(51) Int. Cl.
  *H04L 27/36* (2006.01)
  *H04B 7/04* (2006.01)
  *H04B 7/06* (2006.01)

(52) U.S. Cl.
  CPC ............ *H04B 7/0413* (2013.01); *H04B 7/0691* (2013.01)
  USPC .......................................... 375/298; 375/295

(58) Field of Classification Search
  USPC ................................. 375/298, 295
  See application file for complete search history.

(56) References Cited

U.S. PATENT DOCUMENTS

| | | | |
|---|---|---|---|
| 6,542,556 B1 * | 4/2003 | Kuchi et al. ................... | 375/299 |
| 7,505,788 B1 | 3/2009 | Narasimhan | |
| 7,978,798 B2 | 7/2011 | Hwang et al. | |
| 8,094,743 B2 | 1/2012 | Ahn et al. | |
| 2002/0094783 A1 * | 7/2002 | Chau et al. ................... | 455/67.1 |
| 2007/0099584 A1 | 5/2007 | Niu et al. | |
| 2009/0003466 A1 * | 1/2009 | Taherzadehboroujeni et al. ............................. | 375/260 |
| 2013/0126713 A1 * | 5/2013 | Haas et al. ................. | 250/208.2 |

OTHER PUBLICATIONS

Raed Y. Mesleh, et al., "Spatial Modulation", IEEE, Transactions on Vehicular Technology, vol. 57, No. 4, Jul. 2008, pp. 2228-2241.
Jeyadeepan Jeganathan, et al., "Spatial Modulation: Optimal Detection and Performance Analysis", IEEE, Communications Letters, vol. 12, No. 8, Aug. 2008, pp. 545-547.
Jeyadeepan Jeganathan, et al., "Space Shift Keying Modulation for MIMO Channels", IEEE, Transactions on Wireless Communications, vol. 8, No. 7, Jul. 2009, pp. 3692-3703.

(Continued)

*Primary Examiner* — Shuwang Liu
*Assistant Examiner* — Nader Bolourchi
(74) *Attorney, Agent, or Firm* — Jianq Chyun IP Office

(57) ABSTRACT

A method for data transmission using spatial-domain modulation, and a transmitter using the same has been proposed. The method comprises the following steps including at least but not limited to receiving a plurality of symbols to be transmitted, mapping the symbols as L-dimensional coordinate, wherein 1<L<N, dividing the antennas into L non-overlapping antenna groups, choosing one activating antenna from the antennas in each of the antenna groups according to the coordinate of the symbols, and transmitting modulated signal by using the activating antenna in each of the antenna groups.

9 Claims, 8 Drawing Sheets

(56) References Cited

OTHER PUBLICATIONS

Jeyadeepan Jeganathan, et al., "Generalized Space Shift Keying Modulation for MIMO Channels", IEEE, 19th International Symposium on Personal, Indoor and Mobile Radio Communications, PIMRC, Sep. 2008, pp. 1-5.

Ping Yang, et al., "Adaptive Spatial Modulation for Wireless MIMO Transmission Systems", IEEE, Communications Letters, vol. 15, No. 6, Jun. 2011, pp. 602-604.

Marco Di Renzo, et al., "Bit Error Probability of SM-MIMO Over Generalized Fading Channels", IEEE, Transactions on Vehicular Technology, vol. 61, No. 3, Mar. 2012, pp. 1124-1144.

\* cited by examiner

| Input Bits | Antenna Number | Transmitting Symbol |
|---|---|---|
| 000 | 1 | −1 |
| 001 | 1 | +1 |
| 010 | 2 | −1 |
| 011 | 2 | +1 |
| 100 | 3 | −1 |
| 101 | 3 | +1 |
| 110 | 4 | −1 |
| 111 | 4 | +1 |

FIG. 1

| Input Bits | Activated Antenna Number | Transmitting Signal Vector |
|---|---|---|
| 000 | (1,2) | $[\frac{1}{\sqrt{2}} \ \frac{1}{\sqrt{2}} \ 0 \ 0 \ 0]^T$ |
| 001 | (1,3) | $[\frac{1}{\sqrt{2}} \ 0 \ \frac{1}{\sqrt{2}} \ 0 \ 0]^T$ |
| 010 | (1,4) | $[\frac{1}{\sqrt{2}} \ 0 \ 0 \ \frac{1}{\sqrt{2}} \ 0]^T$ |
| 011 | (1,5) | $[\frac{1}{\sqrt{2}} \ 0 \ 0 \ 0 \ \frac{1}{\sqrt{2}}]^T$ |
| 100 | (2,3) | $[0 \ \frac{1}{\sqrt{2}} \ \frac{1}{\sqrt{2}} \ 0 \ 0]^T$ |
| 101 | (2,4) | $[0 \ \frac{1}{\sqrt{2}} \ 0 \ \frac{1}{\sqrt{2}} \ 0]^T$ |
| 110 | (2,5) | $[0 \ \frac{1}{\sqrt{2}} \ 0 \ 0 \ \frac{1}{\sqrt{2}}]^T$ |
| 111 | (3,4) | $[0 \ 0 \ \frac{1}{\sqrt{2}} \ \frac{1}{\sqrt{2}} \ 0]^T$ |

FIG. 2

METHOD FOR DATA MODULATION AND TRANSMITTER USING THE SAME

CROSS-REFERENCE TO RELATED APPLICATION

This application claims the priority benefits of U.S. provisional application Ser. No. 61/693,340, filed on Aug. 27, 2012. The entirety of the above-mentioned patent application is hereby incorporated by reference herein and made a part of this specification.

TECHNICAL FIELD

The present disclosure generally relates to a data modulation method, and a transmitter using the same.

BACKGROUND

Recent researches have found that by equipping transmitters and receivers of wireless communication systems with large antenna arrays, large array gains and high data rate can be attained with low transmission power. Such communication scheme, known as Massive-Multiple Input Multiple Output (MIMO), is a promising technique for future wireless communication systems because of its high power efficiency. The benefits of Massive-MIMO may include power saving, high beam forming gain, low interference generation, and robustness. However, in order to achieve tremendous link gains via beamforming with Massive-MIMO, knowledge of accurate channel state information (CSI) could be required at the transmitter. The acquisition of precise CSI at the transmitter would be impractical in many cases such as frequency-division duplex (FDD) systems since additional feedbacks would be required for frequency-division duplex (FDD) systems. Also the feedback overheads could be overwhelming for Massive-MIMO because of the sheer quantities of transmitting and receiving antennas.

Apart from the beamforming techniques for which CSI is needed at the transmitter, Massive-MIMO is also advantageous to be incorporated into spatial-domain modulation schemes, in which CSI would not be needed at the transmitter side. The concept of spatial-domain modulation is to convey data by the spatial activation and deactivation patterns of transmitting antennas. The classic examples of Spatial-domain modulation may include spatial modulation (SM) and generalized space shift keying (GSSK).

For SM, information bit streams could first be segmented into two portions: the first portion could be conveyed by the index of the only one active antenna during each signaling interval, while the second portion could be signaled by the physically transmitted data symbol on that antenna.

An illustration of SM scheme is shown in FIG. 1. Assuming that the intended input bits in the left most column of FIG. 1 are 3-bits symbols. Based on the SM scheme, the first two bits could be conveyed by the index of the antenna in the second column. The third bit of each of the input bits could be signaled by the physically transmitted data symbol on that antenna. In this example, the first two bits of the input bits 000 are 00, so 00 is represented by the index 1 or the first antenna as illustrated in the second column of FIG. 1. The last bit of the input bits 000 is 0 which would be modulated by BPSK, and the therefore transmitting symbol of the last bit 0 would be −1 as illustrated in the third column. By following this mapping rule, each of the input bits could be transmitted on a particular antenna and signaled according to the currently configured modulation scheme.

On the other hand, in GSSK, the data is merely conveyed by indices set of active antennas. An exemplary mapping table for GSSK could be illustrated in FIG. 2. The first column of the mapping table of FIG. 2 could be any possible input bits. Assuming that there are five antennas, the activated antenna number in the second column indicates the indexes of any two activated antennas. The third column indicates transmitting signal vector of every input bits. For example, the input bits 001 would be transmitted by activated antenna 1 and activated antenna 3. The transmitting signal vector of the input bits 001 shows that only antenna 1 and antenna 3 transmit the signal. It would be apparent that the data rate of GSSK is dependent on the total number of active antennas. Accordingly, exploiting the resource on spatial domain is relatively more cost-effective than time and frequency domains. High data rate can be achieved with lower-order modulations. For instance, SM allows 3 bits to be transmitted using BPSK symbol with 4 transmitting antennas. Inter-antenna synchronization issues can be relented. Low hardware cost as the number of required RF chains is significantly reduced.

However, there are still several drawbacks in SM and GSSK. Under a fixed antenna array size, data rates for SM could be boosted by launching symbols of a higher-order IQ-modulation on the activated antenna. Increasing modulation order would be undesirable in noisy channel. For GSSK, the antenna array size and the number of activated antennas have to be increased in order to increase the bit size of a symbol. For instance, in order to represent 64-QAM (6 bits) with 8 antennas, at least 4 antennas should be turned on. To represent 256-QAM (8 bits) with 16 antenna, at least 3 antennas should be turned on. Moreover, maximum-likelihood (ML) detection has been suggested as the receiver's algorithm for both SM and GSSK, the computational complexity to perform ML would be unacceptable in practice despite its optimal performance. These aforementioned challenges could become issues of focus for those who are skilled in the art.

SUMMARY OF THE DISCLOSURE

Accordingly, the present disclosure is directed to a method for spatial-domain modulation and detecting spatial-domain modulation signal, a receiver using the same and a transmitter using the same.

A spatial-domain modulation method is introduced herein. According to an exemplary embodiment, the spatial-domain modulation method is adapted to a transmitter having an antenna array with N antennas, wherein N>1. The method comprises the following steps. Receiving a plurality of symbols to be transmitted. Mapping the symbol as L-dimensional coordinate, wherein 1<L<N. Dividing the antennas into L non-overlapping antenna groups. Choosing one activating antenna from the antennas in each of the antenna groups according to the coordinate of the symbols. Transmitting modulated signal by using the chosen activating antenna in each of the antenna groups, wherein a signal modulation scheme used on each of the L chosen activating antennas is determined in accordance to the L-dimensional coordinate.

A transmitter is introduced herein. According to an exemplary embodiment, the transmitter using data modulation method in a multi-antenna system comprises an antenna array having N antennas, a communication unit, and a processing circuit. The processing circuit is configured for executing the following steps. Receiving a plurality of symbols to be transmitted. Mapping the symbols as L-dimensional coordinate, wherein 1<L<N. Dividing the antennas into L non-overlapping antenna groups. Choosing one activating antenna from the antennas in each of the antenna groups according to the coordinate of the symbols. Transmitting modulated signal by using the chosen activating antenna in each of the antenna groups, wherein the activating antenna in each of the antenna groups are chosen in according with each of the symbols. A method of detecting a spatial-domain modulation signal is introduced herein, wherein a signal modulation scheme used on each of the L chosen activating antennas is determined in accordance to the L-dimensional coordinate.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

FIG. 1 illustrates mapping table of SM in the related art.

FIG. 2 illustrates mapping table of GSSK in the related art.

DETAILED DESCRIPTION OF DISCLOSED EMBODIMENTS

Figure 3:
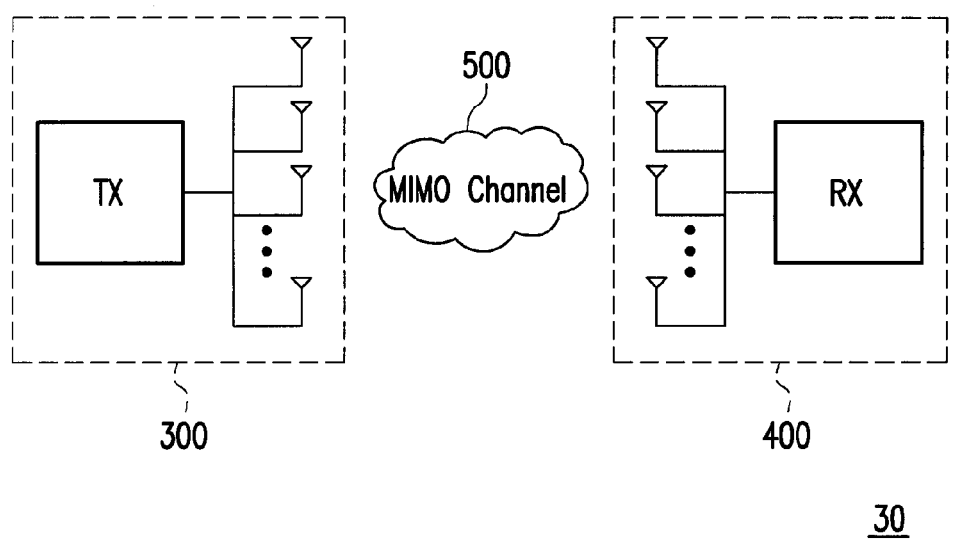
FIG. 3 illustrates an exemplary MIMO system in accordance with the present disclosure.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A receiver and transmitter in this disclosure could be applied into a control node or an UE. A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations.

The control node may also be referred to entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, the receiver may also be referred to as an apparatus including at least but not limited to a receiver circuit, an analog-to-digital (A/D) converter, a processing circuit, one or more antenna units, and optionally a storage medium. The transmitter may also be referred to as an apparatus including at least but not limited to a transmitter circuit, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth.

The processing circuit is configured to process digital signal and to perform procedures related to the proposed method in accordance with exemplary embodiments of the present disclosure. Also, the processing circuit may optionally be coupled to a memory circuit to store programming codes, device configurations, a codebook, buffered or permanent data, and etc. . . . . The functions of the processing circuit may be implemented using programmable units such as a microprocessor, a micro-controller, a DSP chips, FPGA, etc. The functions of the processing circuit may also be implemented with separate electronic devices or ICs, and the processing circuit may also be implemented with either hardware or software.

FIG. 3 illustrates a MIMO communication system. Referring to FIG. 1, a MIMO communication system 30 includes a transmitter 300 and a receiver 400. Both transmitter 300 and the receiver 400 could be applied into wireless communication devices. For example, the transmitter 300 could be applied into a base station or be used in any of the aforementioned control nodes, and the receiver 400 could be applied into a mobile station or be used in any of the aforementioned user equipments. However, the present disclosure is not limited thereto. Referring to FIG. 3, the transmitter 300 can transmit radio signals to the receiver 400 through a MIMO channel 500. It is noted that, the wireless communication devices including a transmitter 300 could also have a receiver to receive radio signals through a MIMO channel 500. Similarly, the wireless communication devices including a receiver 400 could also have a transmitter to transmit radio signals through a MIMO channel 500.

Figure 4A:
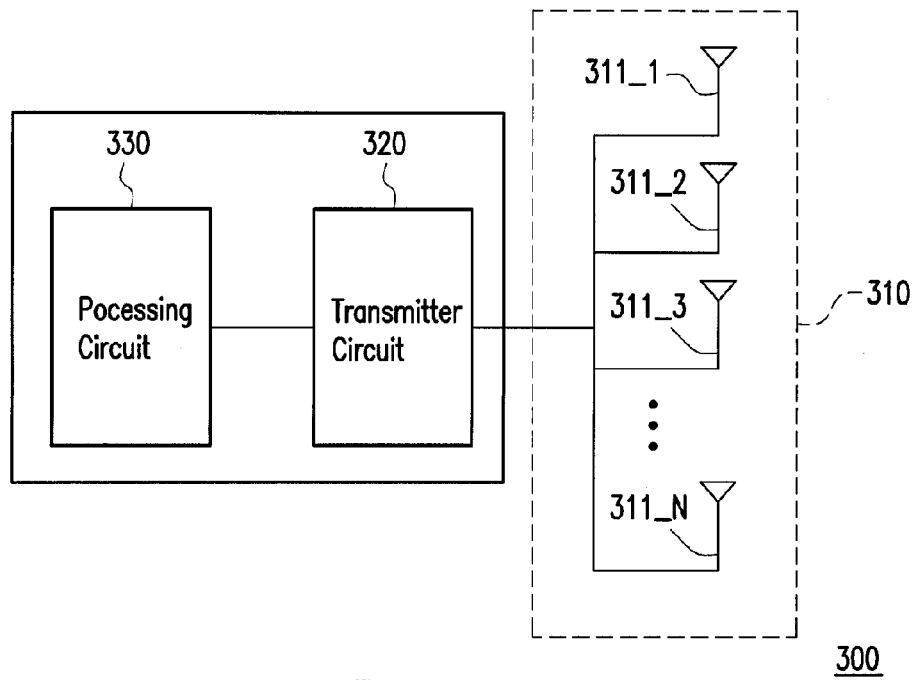
FIG. 4A is a functional block diagram illustrating a transmitter according to an exemplary embodiment.
Figure 4B:
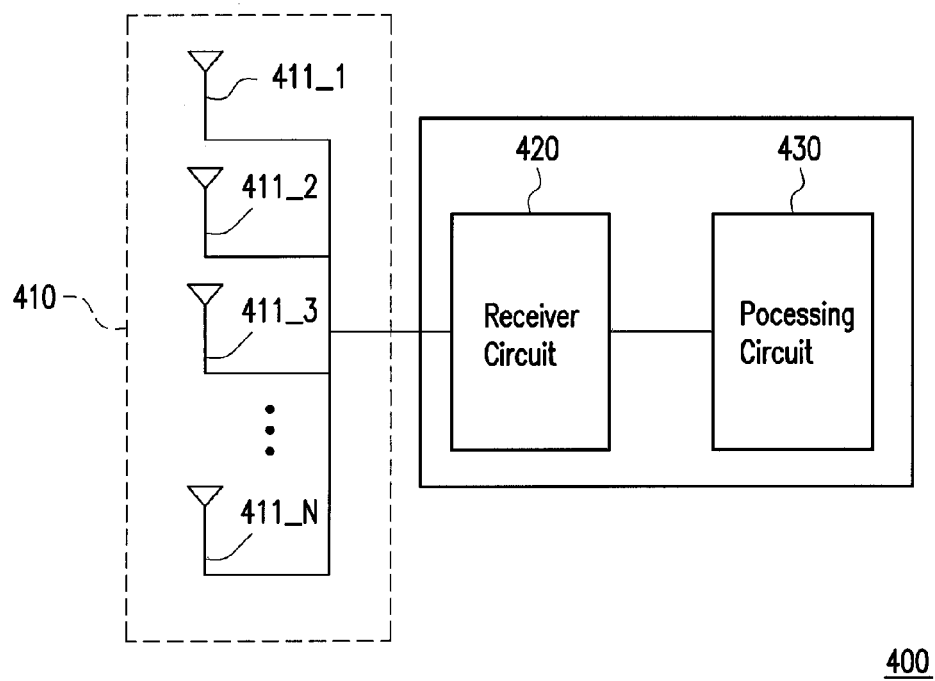
FIG. 4B is a functional block diagram illustrating a receiver according to an exemplary embodiment.

FIG. 4A is a functional block diagram illustrating a transmitter according to an exemplary embodiment. Referring to FIG. 4A, a transmitter 300 can be applied in a wireless communication device at a transmitting end, and can include at least an antenna array 310, a transmitter circuit 320 and a processing circuit 330, wherein the antenna array 310 may include N antennas 311_1~311_N. FIG. 4B is a functional block diagram illustrating a transmitter according to an exemplary embodiment. Referring to FIG. 4B, a transmitter 400 can be applied in a wireless communication device at a receiving end, and can include at least an antenna array 410, a receiver circuit 420 and a processing circuit 430, wherein the antenna array 410 includes R antennas 411_1~411_R. The transmitter 300 and the receiver 400 are configured for transmitting signals to another wireless communication device and receiving signals from another wireless communication device respectively.

Figure 5:
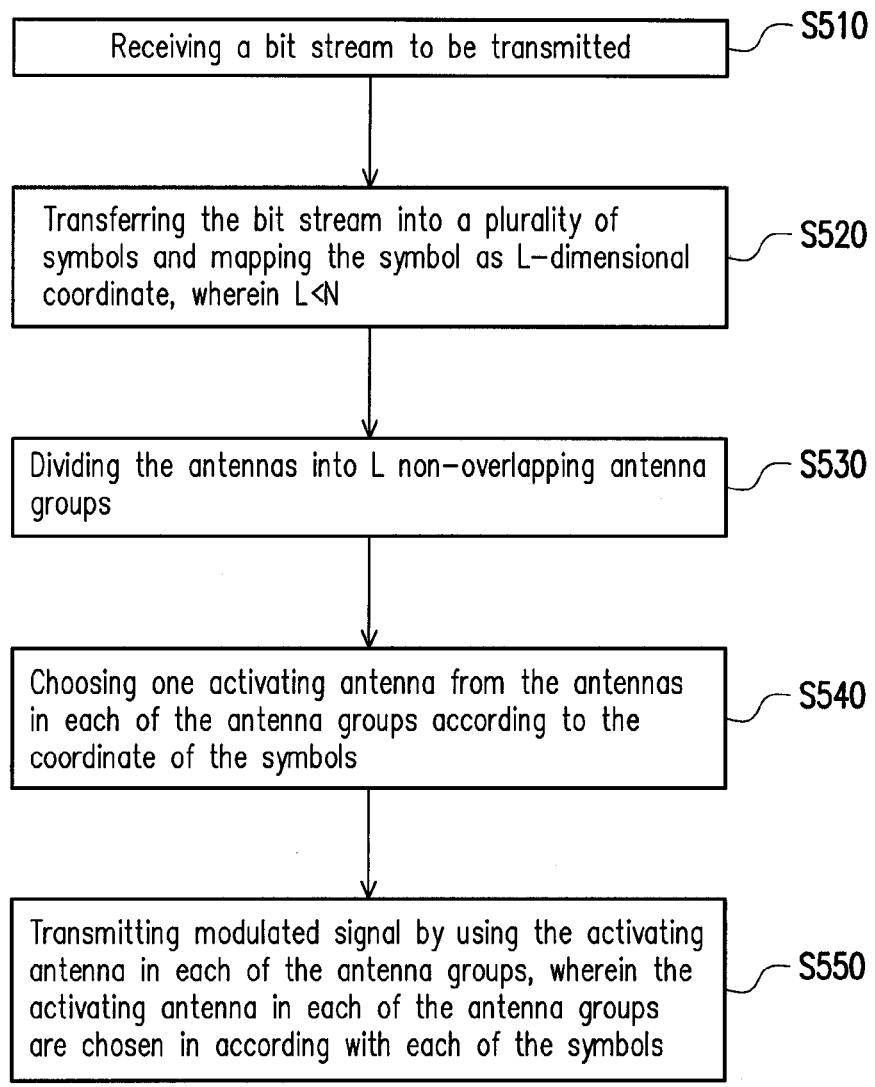
FIG. 5 illustrates a flowchart of a spatial-domain modulation method for multi-antenna system according to one of the exemplary embodiments of the present disclosure.

FIG. 5 illustrates a flowchart of a spatial-domain modulation method for multi-antenna system according to one of the exemplary embodiments of the present disclosure. Referring to FIG. 4A and FIG. 5, the spatial-domain modulation method for multi-antenna system starts from step S510, in which the processing circuit 330 may receive a bit stream to be transmitted. In the step S520, the processing circuit 330 may transfers the bit stream into a plurality of symbols and maps each symbol to L-dimensional coordinate, wherein 1<L<N. The most trivial example would be the symbol points on the constellation diagrams for in-phase/quadrature (IQ) modulation, in which each symbol is express by a coordinate with L=2 dimensions. For example, the bit stream could be modulated by M-ary quadrature amplitude modulation (QAM).

In the step S530, the processing circuit 330 divides the antennas 311_1~311_N into L non-overlapping antenna groups. In the present disclosure, the L-dimension coordinate could be presented by using indices of L active transmit-antennas with one active antenna per antenna group, while the other antennas are muted. In other words, the N transmit antennas are divided into L non-overlapping antenna groups. Each group corresponds to one of the dimensions.

In the step S540, the processing circuit 330 chooses one activating antenna from the antennas 311_1~311_N in each of the antenna groups according to the coordinate of the symbols. Simply, in every signaling interval, one antenna per group is activated in accordance to the magnitude of the associated coordinate component. In detail, the processing circuit 330 assigns each of the groups to represent the dimension respectively. Also, in according with the groups, the processing circuit 330 determines one activating antenna representing each of the dimensions respectively based on the coordinate of the symbols.

In the step S550, the processing circuit 330 transmits modulated signal by using the activating antenna in each of the antenna groups, wherein the activating antenna in each of the antenna groups are chosen in according with each of the symbols to be transmitted. It is noted that, the processing circuit 330 encodes the symbols in according with each of the activating antenna by using a signal modulation scheme. For example, the negative/positive sign of each coordinate component is in indicated by using the polarity of a binary phase shift keying (BPSK) symbol on each activated antenna, but this disclosure is not limited to it. The signal modulation scheme also comprises Quadrature Phase Shift Keying (QPSK), Quadrature Amplitude Modulation (QAM), or any combination thereof.

Figure 6A:
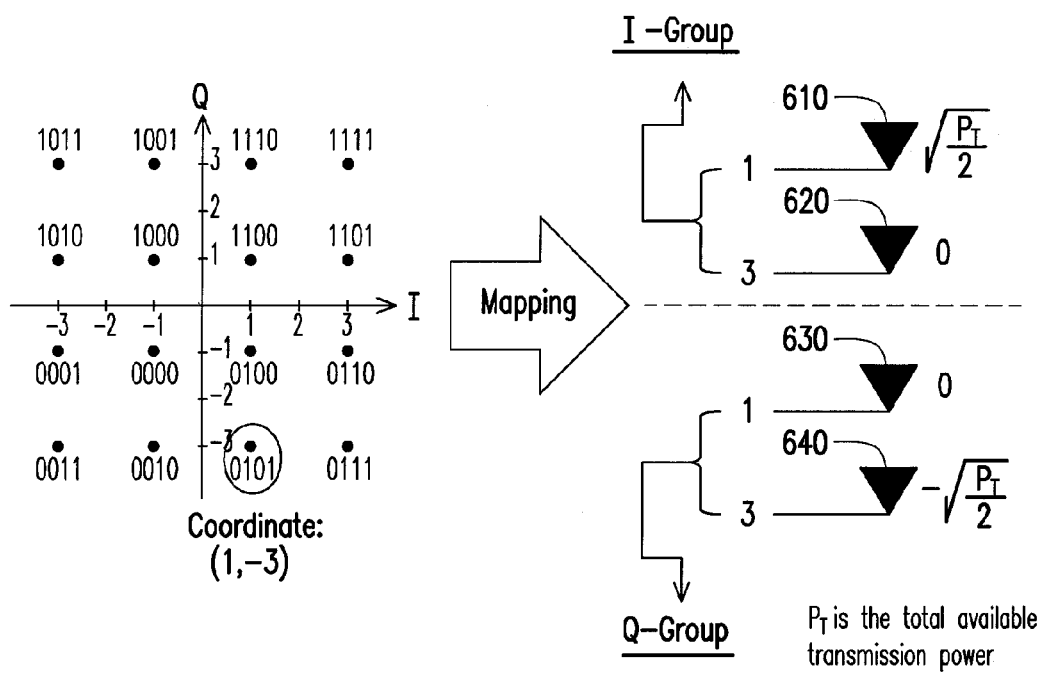
FIG. 6A is a schematic diagram illustrating spatial-domain modulation with L=2 according to one of the exemplary embodiments of the present disclosure.

FIG. 6A is a diagram illustrating a case in which L=2 by assuming that symbol are extracted from an IQ signal constellation. It is noted that, the extensions to cases with L>2 are straight forward. Referring to FIG. 6, in this case, in order to send a 4-bits message on the 16-QAM signal constellation diagram with N=4 transmit-antennas, which are formed into L=2 groups, each group is consisting of two antennas. How the antennas are grouped can be done arbitrarily. Each of the antenna groups corresponds to one dimension of the symbol coordinate; in QAM cases, the two groups can be designated as I-group (for in-phase component) and Q-group (for quadrature component) respectively. Each antenna within a group represents the absolute magnitude of a possible value of the group's correspondent component. In this case, the two antennas in each group respectively represent 1 and 3, since the unnormalized absolute value of any coordinate component in the 16-QAM constellation is either 1 or 3. The antennas in each group are activated or remain muted in accordance to the presence of its associated component value in the message symbol coordinate, so only one antenna per group is activated in a channel use. Furthermore, the sign of each component value (negative or positive) is indicated by applying BPSK signal on each of the active antennas. It is noted that, in the other embodiment, the antennas could be any type of the signal emitter such as light-emitting diodes.

FIG. 6A is a schematic diagram illustrating spatial-domain modulation for L=2 according to one of the exemplary embodiments of the present disclosure. Referring FIG. 5 and FIG. 6, in the step S510, the transmitter would receive a bit stream to be transmitted. For example, the bit stream may include a plurality of bits, such as 01010001. In the step S520, the transmitter may transfer the bit stream 01010001 into a plurality of symbols and maps the symbol as 2-dimensional coordinate, FIG. 6A shows that the coordinate of the symbol for the 4-bits information '0101' is (1,−3) on the 16-QAM signal constellation. In the step S530, the transmitter would divide the antennas 610~640 into 2 non-overlapping antenna groups. In the step S540, the transmitter would choose one activating antenna from the antennas 610~640 in each I-group and Q-group according to the coordinate of the symbol '0101'.

In the step S550, the transmitter would transmit modulated signal by using the activating antenna in each of the antenna groups, Since the in-phase component of the coordinate is 1, a positive BPSK symbol is signaled by the antenna 610 that represents '1' in the I-group. Similarly, the quadrature component of the symbol coordinate is −3, so a negative BPSK symbol is launched by the antenna 640 that represents '3' in Q-group. The remaining antenna 620 and antenna 630 are all muted. Therefore, the power that can be loaded on each active antenna is $P_T/3$, wherein $P_T$ is the total available power at the transmitter.

Figure 6B:
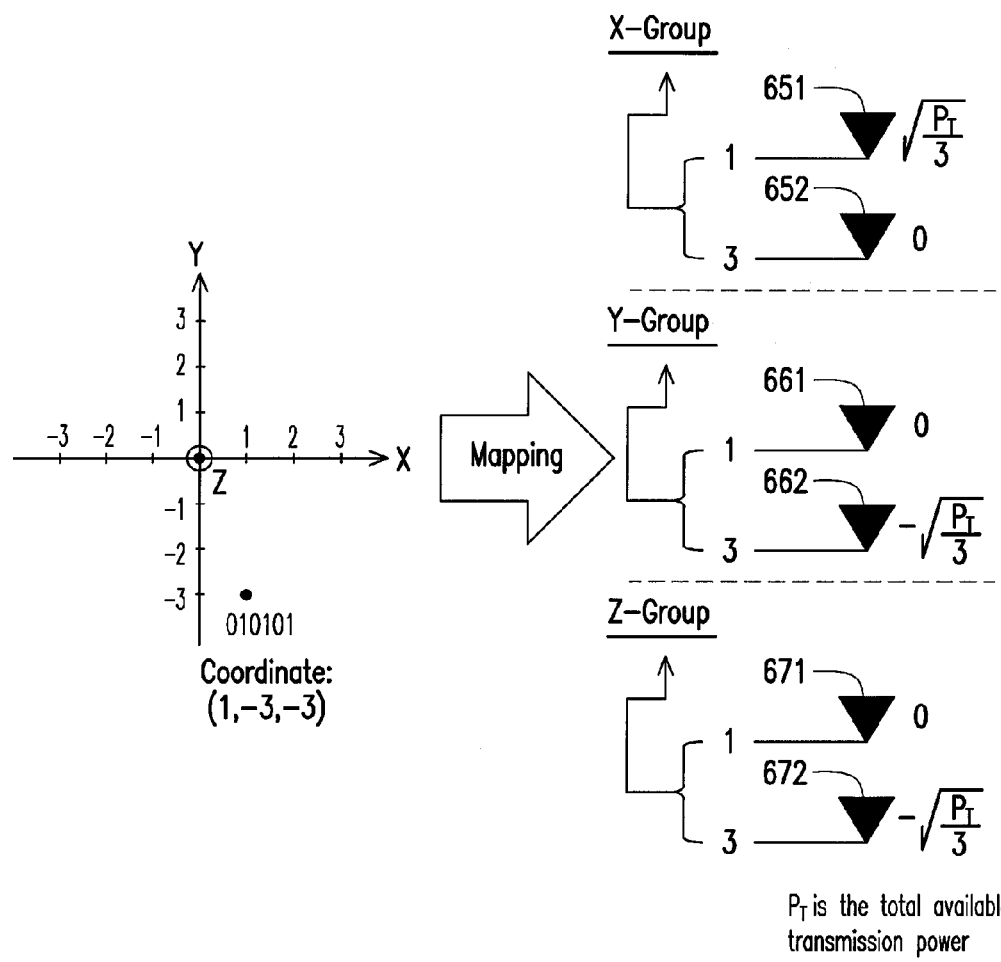
FIG. 6B is a schematic diagram illustrating spatial-domain modulation with L=3 according to one of the exemplary embodiments of the present disclosure.

FIG. 6B is a schematic diagram illustrating spatial-domain modulation for L=3 according to one of the exemplary embodiments of the present disclosure. Based on the foregoing description, FIG. 6B shows that the coordinate of the symbol for the 6-bits information '010101' is (1,−3,−3) on the signal constellation. Since the X-group component of the coordinate is 1, a positive BPSK symbol is signaled by the antenna 651 that represents '1' in the X-group. Similarly, the Y-group component of the symbol coordinate is −3, so a negative BPSK symbol is launched by the antenna 662 that represents '3' in Y-group. Similarly, the Z-group component of the symbol coordinate is −3, so a negative BPSK symbol is launched by the antenna 672 that represents '3' in Z-group. The remaining antennas are all muted. Therefore, the power that can be loaded on each active antenna is $P_T/2$, wherein $P_T$ is the total available power at the transmitter.

Moreover, the achievable rate of the spatial-domain modulation in the present disclosure could be represented as equation (1).

$$\text{Rate} = L\log_2(N) \text{bits per channel} \quad (1)$$

For instance, with N=16 transmit-antennas, the spatial-domain modulation in the present disclosure could be used to send a 8-bits symbol (with L=2) in one channel. Obviously, the transmitter only requires two RF chains as two antennas are activated in each signaling session. Besides, BPSK symbols used in physical signaling makes the communication system more robust, as BPSK is robust to noise. Compare to other spatial modulation, in order to achieve the same data rate under the foregoing case, 16-QAM symbols are launched to send 8 bits has lower reliability. On the other hand, GSSK requires at least 3 RF chains to send 8 bits and it cost higher hardware cost.

A method of detecting a spatial-domain modulation signal would be discussed according to another exemplary embodiment of the present disclosure. This embodiment corresponds to a detection method. In the foregoing embodiment, it is assumed that the antennas are divided into L groups and only one antenna is activated in each group. Therefore, the detection in the present disclosure could be carried out in a "group-by-group" sequential manner.

Mathematically, the signal model for the spatial-domain in MIMO system could be written as equation (2).

$$y = Hx + w \quad (2)$$

Figure 7:
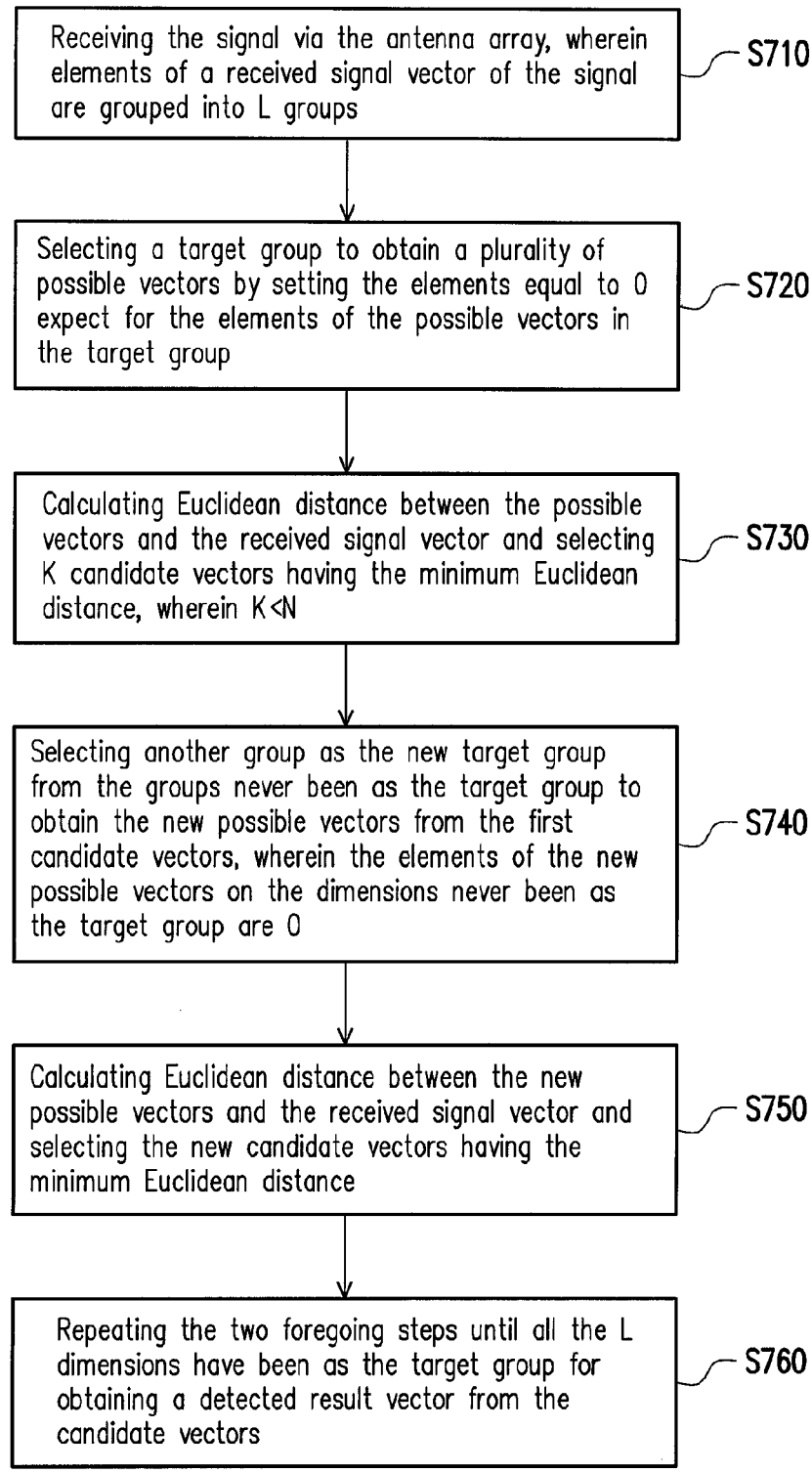
FIG. 7 illustrates a flowchart of method for detecting spatial-domain modulation signal for multi-antenna system according to one of the exemplary embodiments of the present disclosure.

In equation (2), x and y are the N-by-1 transmit-signal vector and R-by-1 received signal vector respectively, H is R-by-N MIMO channel matrix and w represents additive noise vector. FIG. 7 illustrates a flowchart of a spatial-domain modulation method for multi-antenna system according to a first exemplary embodiment. Referring to FIG. 4B and FIG. 7 together, the spatial-domain modulation method for multi-antenna system would stars from step S710, in which the processing circuit 430 receives a signal via the antenna array 410, wherein elements of a received signal vector are grouped into L groups responding to the spatial-domain method. For example, the method is explained based on the cases with L=2, where the transmit antennas have been divided into I-group and Q-group, as the example elucidated for the first embodiment, in which the received signal vector $x=[X_I X_Q]^T$ is consisted of two (0.5*N)-by-1 vectors $X_I$ (I-group) and $X_Q$ (Q-group), and each of vectors $X_I$ and $X_Q$ has only one non-zero element. In detail, vector $X_I=[X_{I,1} X_{I,2} \ldots X_{I,N/2}]^T$ and vector $X_Q=[X_{Q,1} X_{Q,2} \ldots X_{Q,N/2}]^T$. The elements of the vector $X_I$ and the vector $X_Q$ are equal to $0, \sqrt{(P_T/2)}$ or $-\sqrt{(P_T/2)}$. It is noted that, there is only one element in vector $X_I$ and the vector $X_Q$ is $\sqrt{(P_T/2)}$ or $-\sqrt{(P_T/2)}$.

In the step S720, the processing circuit 430 selects a target group to obtain a plurality of possible vectors by setting the elements equal to 0 expect for the elements of the possible vectors in the target group. In the step S730, the processing circuit 430 calculates Euclidean distance between the possible vectors and the received signal vector and selecting K candidate vectors having the minimum Euclidean distance, wherein K<N.

For example, in the case of L=2, the processing circuit 430 could select vector $X_I$ as the target group and the detecting method of the present disclosure commences by finding K candidate vectors from the N/2 possible value of $X_I$ that results in minimum Euclidean distance between the received signal vector y and the possible vectors $X_{po}$ with the elements of vector $X_Q$ replaced by a (0.5*N)-by-1 zero-vector, the formula for calculating Euclidean distance could be written as equation (3).

$$d = \|y - H[X_I 0]^T\| \quad (3)$$

In the other hand, the processing circuit 430 could select vector $X_Q$ as the target group, and the formula for calculating Euclidean distance could be written as equation (4).

$$d = \|y - H[0 X_Q]^T\| \quad (4)$$

In the step S740, the processing circuit 430 may select another group as the new target group from the groups never been as the target group in order to obtain new possible vectors from the first candidate vectors, wherein the elements of the new possible vectors on the dimensions never been as the target group are 0. In the step S750, the processing circuit 430 calculates Euclidean distance between the new possible vectors and the received signal vector and selecting the new candidate vectors having the minimum Euclidean distance. In the step S760, the processing circuit 430 repeats the two foregoing steps until all the L dimensions have been as the target group for obtaining a detected result vector from the candidate vectors.

For example, in the case of L=2, for the detecting method of the present disclosure, based on each of the K candidate vectors, we search and identify the minimum resultant Euclidean distance between y and x, in which x is constructed by stacking the k-th (k=1 ... K) candidate vectors with the j-th (j=1 ... N) candidate vectors of $X_Q$. That is, $$\{k^*, j^*\} = \arg\min \|y - H[x_{I,k} x_{Q,j}]^T\|, k=1 \ldots K, j=1 \ldots N. \quad (4)$$

Finally, the detected result signal vector would be detected as $\text{Xest} = [X_{I,k^*} X_{Q,j^*}]^T$. The extension to the cases with L>2 is straightforward.

Figure 8:
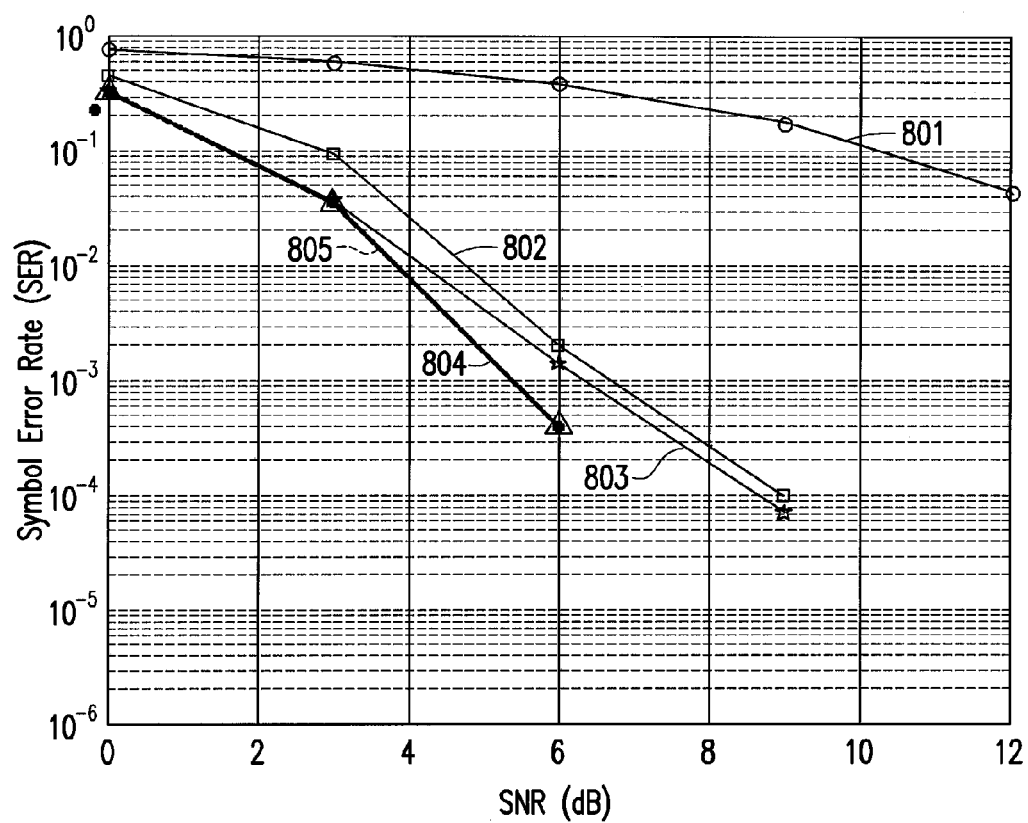
FIG. 8 is a schematic diagram illustrates simulation results of the spatial-domain modulation method with method for detecting spatial-domain modulation signal for multi-antenna system according to one of the exemplary embodiments of the present disclosure.

FIG. 8 is a schematic diagram which illustrates simulation results of the spatial-domain modulation method which uses the method for detecting spatial-domain modulation signal for multi-antenna system according to an exemplary embodiment. By modeling MIMO channel as a R-by-N matrix with independent and identically distributed (iid) zero-mean complex Gaussian entries, the performances in terms of symbol error rate (SER) could derived as illustrated in FIG. 8. For a MIMO system with N=128 transmit-antennas and R=16 receive-antennas is considered, the system is able to send 14-bits information per channel by the spatial-domain modulation method in the present disclosure. To reach the same data rate under the identical system configurations, SM requires 128-QAM modulation to encode the bit stream to be transmitted. Also at least three antennas have to be activated with GSSK for the same data rate. It could be observed that the spatial-domain modulation method in the present disclosure has better SER performance than both SM and GSSK, even if the reduced-complexity detecting method in the present disclosure is applied. Remarkably, detecting the received signal by ML performance could be achieved by setting K=32, notwithstanding a huge complexity reduction of nearly 75%.

In the disclosure and all of the embodiments, no element, act, or instruction used in the description of the present application should be construed as absolutely critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A data modulation method, adapted to a transmitter having an antenna array including N antennas in a multi-antenna communication system, wherein N>1, and the method comprising:
   receiving a plurality of symbols to be transmitted;
   mapping each of the symbols as a L-dimensional coordinate, so as to divide the N antennas into L non-overlapping antenna groups in response to the L-dimensional coordinate, wherein 1<L<N, and each of the L non-overlapping antenna groups comprises at least K antennas, wherein K≥1;
   choosing one activating antenna from the K antennas in each of the L non-overlapping antenna groups according to the L-dimensional coordinate of the symbols; and
   transmitting modulated signal by using the chosen activating antenna in each of the L non-overlapping antenna groups, wherein a signal modulation scheme used on each of the L chosen activating antennas is determined in accordance to the L-dimensional coordinate,
   wherein the step of choosing one activating antenna from the K antennas in each of the L non-overlapping antenna groups according to the L-dimensional coordinate of the symbols comprise:
   assigning the L non-overlapping antenna groups to respectively represent the L dimensions of the L-dimensional coordinate of the symbols; and
   based on the L-dimensional coordinate of the symbols, determining one activating antenna in each of the L non-overlapping antenna groups according to the coordinate value in the dimension that the L non-overlapping antenna groups corresponding to.

2. The data modulation method of claim 1, wherein before receiving the symbols to be transmitted, claim 1 further comprises:
   receiving a bit stream to be transmitted; and
   transferring the bit stream into the symbols.

3. The data modulation method of claim 1, wherein mapping the symbol as L-dimensional coordinate comprises:
   modulating the symbols by using M-ary Quadrature Amplitude Modulation.

4. The data modulation method of claim 1, wherein the signal modulation scheme comprises Binary Phase Shift Keying (BPSK), or Quadrature Phase Shift Keying (QPSK), or Quadrature Amplitude Modulation (QAM), or any combination thereof.

5. A transmitter using data modulation method in a multi-antenna system, and the transmitter comprising an antenna array having N antennas, a communication unit, and a processing circuit is configured for executing:
   receiving a plurality of symbols to be transmitted;
   mapping the symbols as L-dimensional coordinate, so as to divide the N antennas into L non-overlapping antenna groups in response to the L-dimensional coordinate, wherein 1<L<N, and each of the L non-overlapping antenna groups comprises at least K antennas, wherein K≥1;
   choosing one activating antenna from the K antennas in each of the non-overlapping antenna groups according to the L-dimensional coordinate of the symbols; and
   transmitting modulated signal by using the chosen activating antenna in each of the L non-overlapping antenna groups, wherein a signal modulation scheme used on each of the L chosen activating antennas is determined in accordance to the L-dimensional coordinate,
   wherein the processing circuit is configured for choosing one activating antenna from the K antennas in each of the L non-overlapping antenna groups according to the L-dimensional coordinate of the symbols comprise:
   assigning the L non-overlapping antenna groups to respectively represent the L dimensions of the L-dimensional coordinate of the symbols; and
   based on the L-dimensional coordinate of the symbols, determining one activating antenna in each of the L non-overlapping antenna groups according to the coordinate value in the dimension that the L non-overlapping antenna groups corresponding to.

6. The transmitter of claim 5, wherein the processing circuit is configured for receiving the symbols to be transmitted further comprises:
   receiving a bit stream to be transmitted; and
   transferring the bit stream into the symbols.

7. The transmitter of claim 5, wherein the processing circuit is configured for mapping the symbol as L-dimensional coordinate comprises:
   modulating the symbols by using M-ary Quadrature Amplitude Modulation.

8. The transmitter of claim 5, wherein the signal modulation scheme comprises Binary Phase Shift Keying (BPSK), or Quadrature Phase Shift Keying (QPSK), or Quadrature Amplitude Modulation (QAM), or any combination thereof.

9. The transmitter of claim 5, wherein each of the N antennas could be one of a loudspeaker, an ultrasound transmitter or a multiple light emitting diode.

* * * * *